United States Patent [19]

Hsieh et al.

[11] Patent Number: 4,922,226
[45] Date of Patent: May 1, 1990

[54] WATER LEVEL AND TEMPERATURE DETECTOR ALARM DEVICE

[76] Inventors: Sheng-Shun Hsieh; Ting-Chih Liu, both of 2F, 8, Lane 73, Chinshan S. Rd.-Sec. 1, Taipei, Taiwan

[21] Appl. No.: 369,860

[22] Filed: Jun. 22, 1989

[51] Int. Cl.$^5$ .................... G08B 19/00; G01F 23/36
[52] U.S. Cl. .................... 340/521; 340/612; 340/618; 340/623; 340/624; 340/622; 73/290 R; 73/309; 73/313; 73/308; 73/292; 116/227; 116/228; 116/107; 137/386; 137/426; 137/558; 200/84 A; 200/61.04
[58] Field of Search ............. 340/521, 612, 618, 623, 340/624, 625, 622; 73/290 R, 293, 291, 292, 300, 301, 313, 305–308, 309, 322.5; 116/227, 228, 109, 110, 107; 137/386, 392, 397–399, 558, 426; 200/84 A, 84 B, 84 C, 61.04, 190

[56] References Cited

U.S. PATENT DOCUMENTS

| | | | |
|---|---|---|---|
| 2,653,478 | 9/1953 | Harper | 73/309 |
| 4,064,755 | 12/1977 | Bongort et al. | 73/313 |
| 4,186,419 | 1/1980 | Sims | 73/313 |
| 4,384,184 | 5/1983 | Alvarez | 73/313 |
| 4,628,162 | 12/1986 | Reinartz et al. | 73/313 |
| 4,796,473 | 1/1989 | Custer | 73/308 |

Primary Examiner—Donnie L. Crosland
Attorney, Agent, or Firm—Ladas & Parry

[57] ABSTRACT

A water level and temperature detector alarm device and more particularly to an alarm device which includes a buoy type detector to alternately detect water level or water temperature so as to provide an audio alarm signal through a buzzer when water level or water temperature reaches the predetermined range. The detector is connected to the expansible end of a conduit and includes a sleeve having set therein two reed switches and a thermswitch and having mounted thereon a body which includes therein a circular magnet. An alarm device is connected to the other end of the conduit which is having a movable positioning rack mounted thereon for positioning of the whole assembly. Following the rising of water level, the magnet of the buoy alternatively drives the reed switched to turn on the alarm device to buzz or, when water temperature reaches the predetermined range, the thermoswitch will be turned on to drive the alarm device to buzz.

1 Claim, 2 Drawing Sheets

WATER LEVEL AND TEMPERATURE DETECTOR ALARM DEVICE

BACKGROUND OF THE INVENTION

The present invention is related to a water level and temperature detector alarm device and more particularly to one which includes a conduit with both ends respectively connected to a detector and an alarm device and which will automatically provide an audio alarm signal by means of the control of a thermo-switch when water temperature reaches the predetermined range or by means of the control of a magnet of a body through two reed-switches when water level reaches the predetermined range.

In recent years, the saving of water resource has been considered to be important. In industries, automatically controlled water gauge is commonly used to measure the water level. However, regular automatically controlled industrial water gauges are very expensive and not practical for home use. There is a kind of high resistance circuit controlled water level detector alarm device commercialized for home use to detect water level (more particularly the water level in a bathtub) so as to help consumers to minimize water consumption. However, such kind of high resistance circuit tends to short-circuit.

Further, thermometer is a well-known instrument for measuring temperatures. Either mercury type or electronic type, clinical thermometer has become one of home requisites. Although it is not very convenient, some people even use a clinical thermometer to measure the temperature of bath water.

SUMMARY OF THE INVENTION

It is the main object of the present invention to provide an automatic, practical and inexpensive detector alarm device which can automatically detect water level and temperature and provide an audio alarm signal when the level or temperature reaches the predetermined range.

According to the present invention, a water level and temperature detector alarm device is including a buoy type detector to alternatively detect water level or water temperature so as to provide an audio alarm signal through a buzzer when water level or water temperature reaches the predetermined range. The detector is connected to the expansible end of a conduit and comprises a sleeve having set therein two reed switches and a thermo-switch and having mounted thereon a buoy which is comprising therein a circular magnet. An alarm device is connected to the other end of the conduit which is having a movable positioning rack mounted thereon for positioning of the whole assembly. Following the rising of water level, the magnet of the buoy alternatively drives the reed switched to turn on the alarm device to buzz or, when water temperature reaches the predetermined range, the thermo-switch will be turned on to drive the alarm device to buzz.

The present may be fully understood from the following detailed description of the preferred embodiment quoted on the basis of the annexed drawings as hereunder.

DETAILED DESCRIPTION OF THE PREFERRED EMBODIMENT

Figure 1:
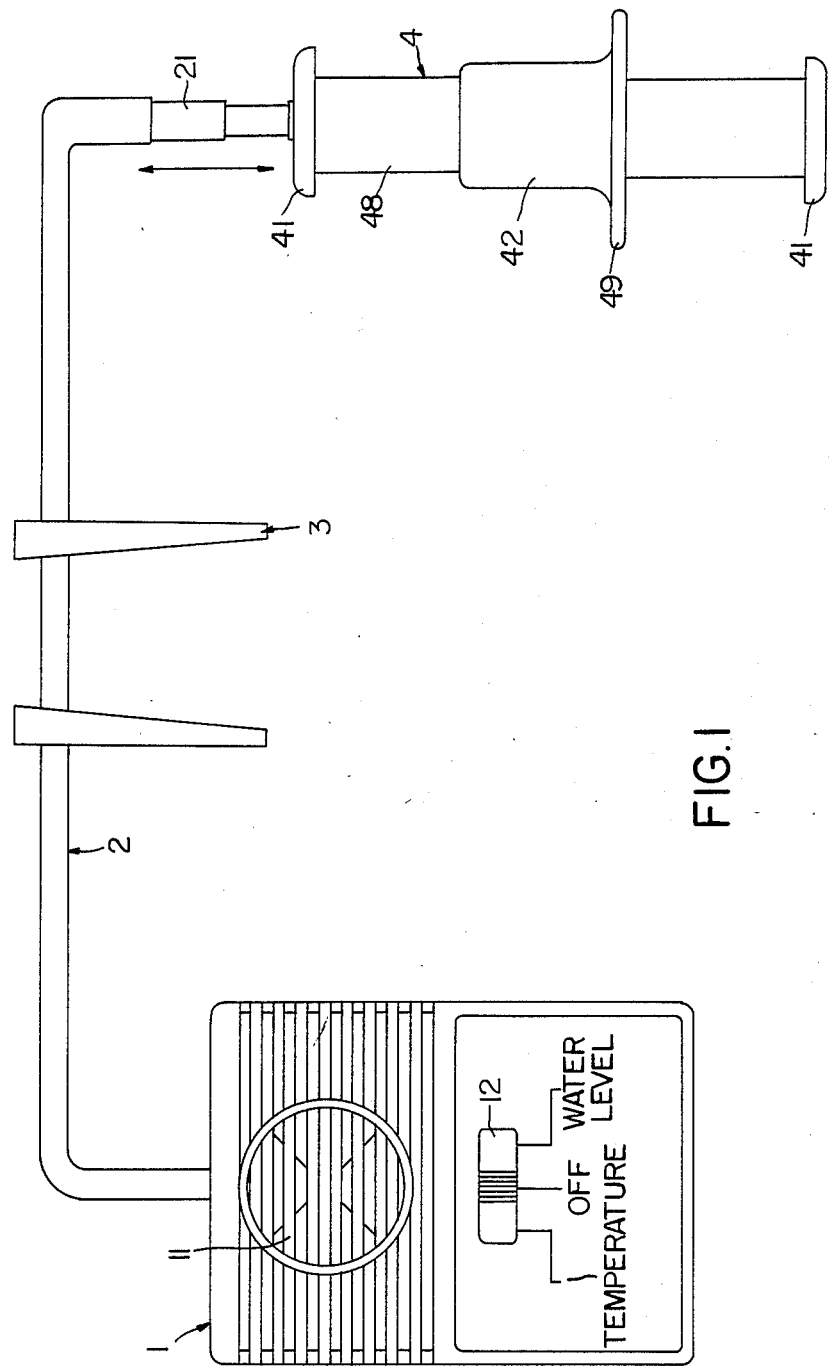
FIG. 1 is a schematic structural view of the present invention.

With reference to FIG. 1, a water level and temperature detector alarm device is including an alarm device (1), an expansible conduit (2), a movable positioning rack (3), and a detector (4).

The alarm device (1) which is connected with the conduit (2) is comprised of a volume adjustable buzzer (11) and a control switch (12). The positioning rack (3) is movably mounted on the conduit (2) for positioning of the whole assembly at any preferred location (for example, the side edge of a bathtub). The conduit (2) is having one end connected to the alarm device (1) and having the other expansible end (21) connected to the detector (4) to adjustably control the level position of the detector (4).

Figure 2:
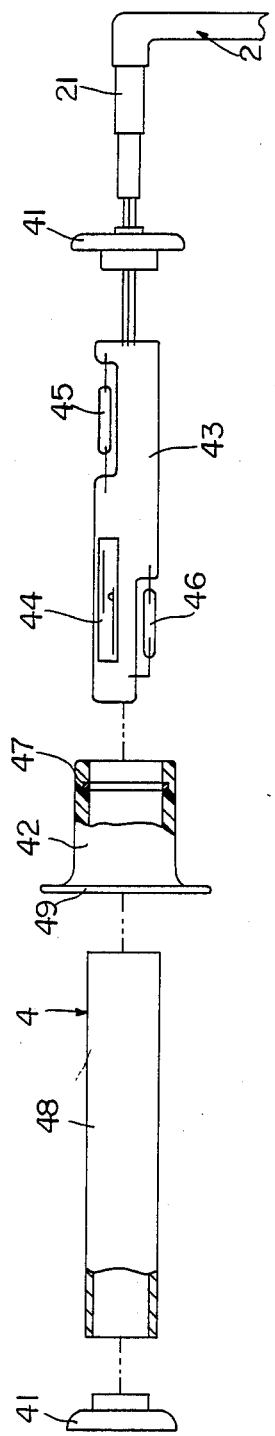
FIG. 2 is a schematic exploded view of the detector according to the present invention.

With reference to FIG. 2, the detector (4) is including a sleeve (48) having both ends respectively connected with a water proof jacket (41). A circuit board (43) which is set inside the sleeve (48) of the detector (4) is comprising a thermo-switch (44), which will be automatically switched on when water temperature reaches a predetermined range, an upper reed switch (45) and a lower reed switch (46). A buoy (42) which is movably mounted on the sleeve (48) is having a circular magnet (47) set therein, and a disc bottom (49), which disc bottom is to be disposed to the water. When the buoy (42) is mounted on the sleeve (48) to slide therealong, the two water proof jackets (41) are respectively connected to the sleeve (48) at both ends.

When in application, the whole assembly of the water level and temperature detector alarm device is positioned at any preferred location (for example, the side edge of a bathtub) by means of the movably positioning rack (3), and the detector (4) is pulled to set at a predetermined altitude by means of the expansible end (21) of the conduit (2). When water level is rising to push upward the buoy (42), the magnet (47) of the buoy (42) will attract the lower reed switch (46) to turn on the circuit so as to further drive the alarm device (1) to buzz through the buzzer (11). As soon as the buoy (42) reaches the position of the upper reed switch (45), it will turn on the circuit to further drive the alarm device to buzz through the buzzer (11) once again. When to detect water temperature, switch the control switch (12) to temperature control position, and the alarm device (1) will be turned on by the thermoswitch (44) to provide an audio alarm signal when water temperature reaches a predetermined temperature.

What is claimed is:

1. A water level and temperature detector alarm device, including:
    an alarm device comprised of a volume adjustable buzzer and a control switch;
    a detector comprising a sleeve having both ends respectively connected with a water proof jacket and having a circuit board set therein, said circuit board comprising a thermo-switch, an upper reed switch and a lower reed switch;
    a buoy being movably mounted on said sleeve and having a circular magnet set therein, and a disc bottom disposed to the water;
    a conduit having one fixed end connected to said alarm device and having the other end expansibly connected to said detector to adjustably control the level position of said detector; and a positioning rack movably mounted on said conduit for positioning of the whole assembly;

wherein said buoy floats upward during the rising of water level, to let said magnet attract either one of said upper and lower reed switches to turn on said circuit board so as to further drive said alarm device to provide audio alarm signal through said buzzer, and wherein said thermo-switch is turned on at the time water temperature reaches the predetermined range, to drive said alarm device to provide audio alarm signal through said buzzer.

* * * * *